UNITED STATES PATENT OFFICE.

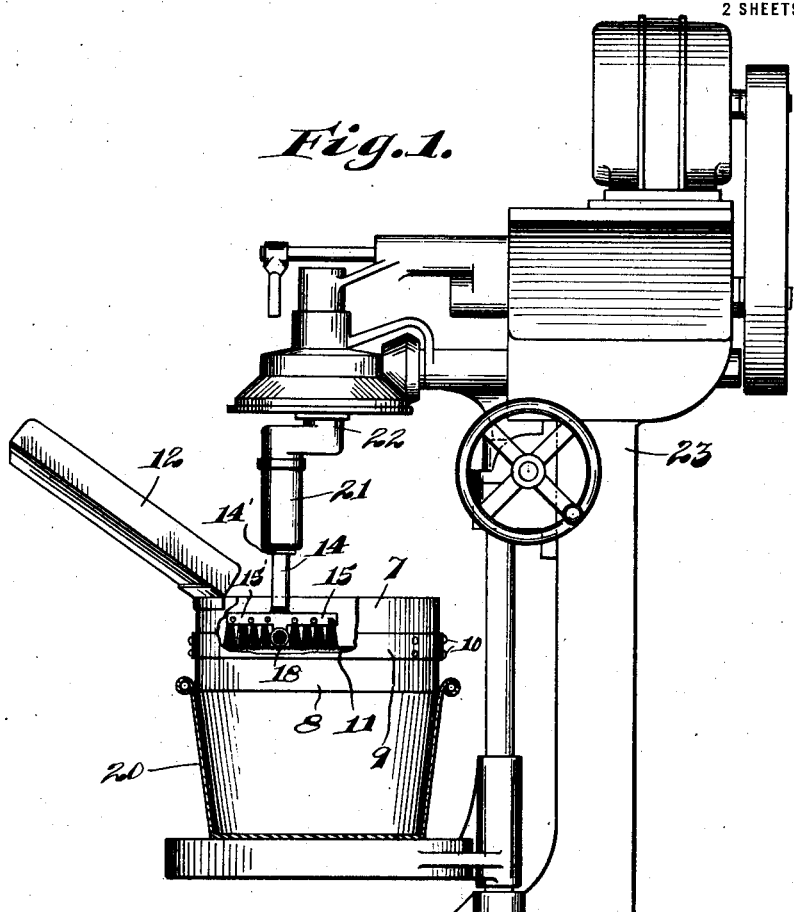
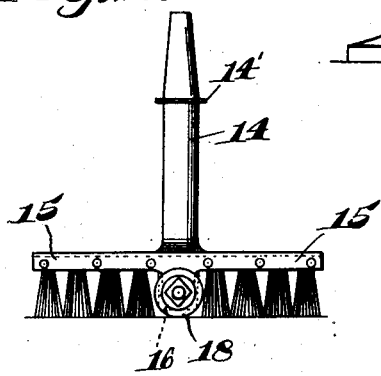
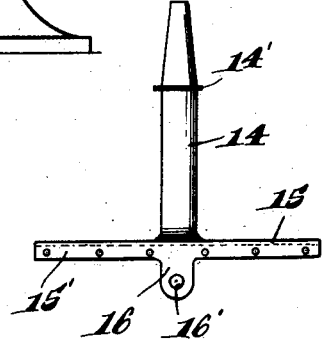

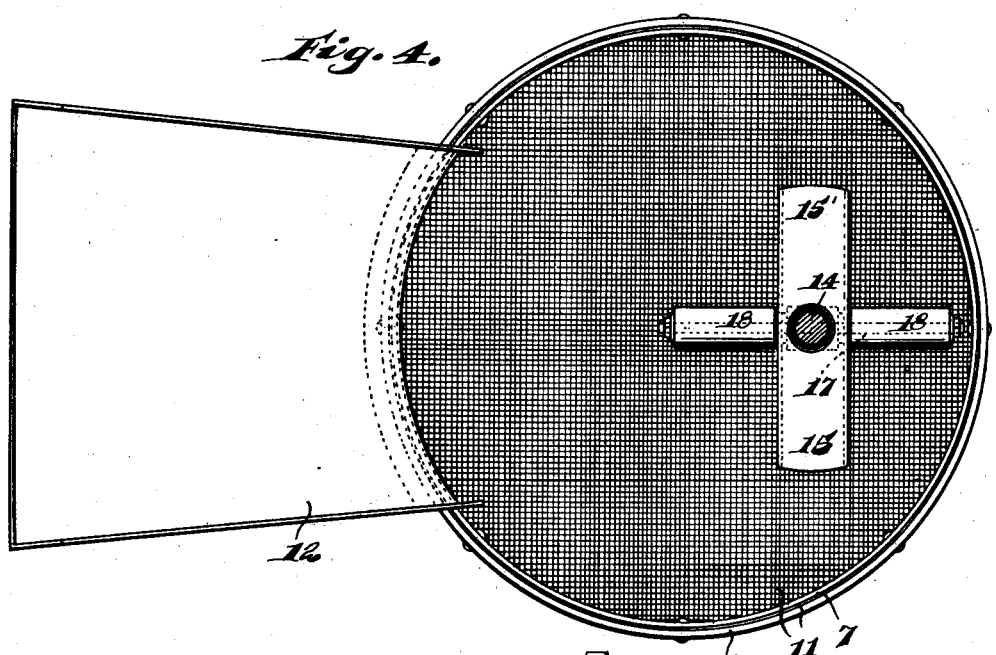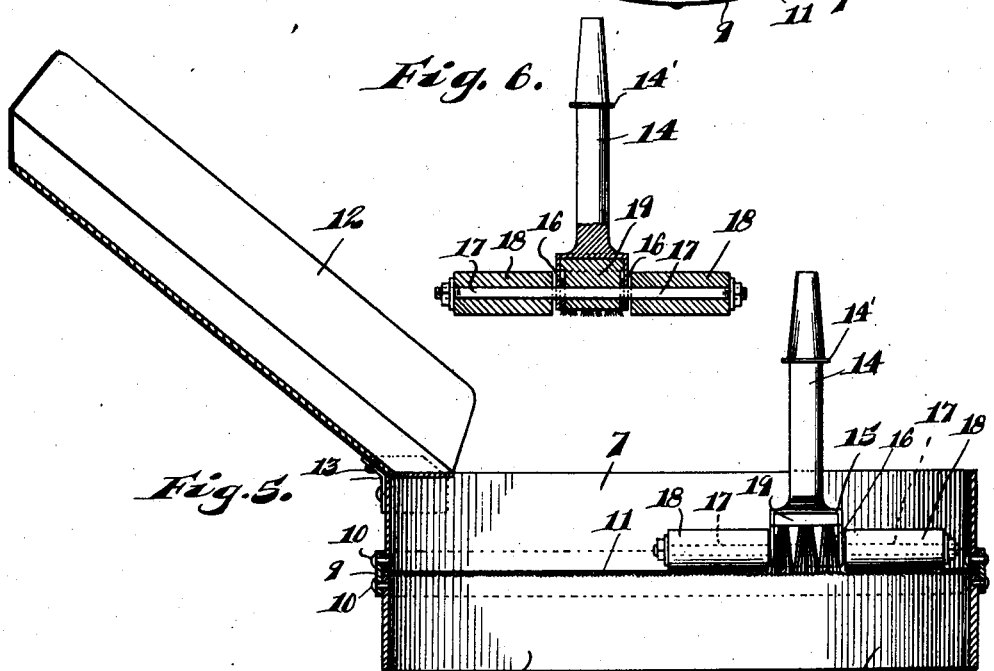

FRANK SMETANA, OF CHICAGO, ILLINOIS.

FLOUR-SIFTER.

1,391,145.   Specification of Letters Patent.   Patented Sept. 20, 1921.

Application filed July 7, 1919. Serial No. 309,084.

*To all whom it may concern:*

Be it known that I, FRANK SMETANA, a citizen of the United States, and a resident of the city of Chicago, county of Cook, and State of Illinois, have invented certain new and useful Improvements in Flour-Sifters, of which the following is a specification.

My invention relates to new and useful improvements in flour sifters and has for its object the provision of a device adapted to crush the lumps in the flour while the same is being sifted.

Another object is the provision of a device which will cause the flour to sift quickly and completely.

Other objects will appear hereinafter.

The invention consists in the combinations and arrangements of parts hereinafter described and claimed.

The invention will be best understood by reference to the accompanying drawings forming a part of this specification, and in which, Figure 1 is a side elevational view of my invention mounted on a power machine with parts removed.

Fig. 2 is a side elevational view of the agitating member complete.

Fig. 3 is a side elevational view of the agitating member with contact members removed.

Fig. 4 is a top plan view of my invention.

Fig. 5 is a longitudinal sectional view of my invention.

Fig. 6 is a sectional view of the contact members.

The approved form of construction, as illustrated in the drawings, comprises a sifter body made up of two circular bands 7 and 8, secured together at adjacent edges by means of the annular band 9 and suitable fastening means, such as rivets 10. Engaged between the adjacent edges of the members 7 and 8, and turned upwardly at the edges between the outer surface of the lower portion of the member 7 and the inner surface of the upper portion of the member 9, is a suitable sieve 11. A chute 12, inclined downwardly, is adapted to discharge into the sifter and is secured to the upper edge of the member 7 by means of an angle iron 13 or other suitable fastening means. In connection with my sifter I use an agitating member having an upright stem 14, adjacent the upper end of which is provided a preferably integral collar 14'. Projecting laterally from the lower end of the member 14 are radiating arms 15 and 15', projecting downwardly from which at the central portion thereof are lugs 16 provided with openings 16' for the engagement therein of a suitable shaft 17. Rotatably mounted upon the shaft 17, adjacent the opposite lugs 16, are rollers 18. As clearly shown in Fig. 3, the arms 15 and 15' are provided at opposite sides with a downwardly projecting flange. Secured to each of the arms 15 and 15' is a suitable bristle retaining member 19, preferably an ordinary brush, which is mounted between the downwardly projecting flanges on the members 15 and 15'. The roller 17 and the lower end of the bristles in the member 19 are adapted to engage with the upper surface of the sieve 17 when in use. My device may be operated either by hand or with a power machine. In Fig. 1 I have illustrated the invention applied to a power machine, in which tub 20 receives the flour after same has passed through the meshes in the sieve 11. As will be noticed, the member 8 forms a flange which projects downwardly from the sieve 11, and thereby prevents scattering of the flour and insures its flow into the tub 20. The upper end of the member 14 is shaped conical and is adapted to be thrust into a socket 21, which is eccentrically mounted upon a shaft 22 secured to the machine 23. As illustrated, the shaft 14 is adapted to rotate, and to move laterally in the sifter body owing to its eccentric mounting, that is, the shaft 14 has a rotatory and also a translatory motion, thereby affording a means whereby the sieve 11 is continually swept clean of flour by the bristles. Lumps which appear in the flour are engaged by the rollers 18 and are consequently crushed, thereby assuring a complete sifting of all the flour.

When the air becomes moist, the flour becomes somewhat dampened and has a tendency to stick together and in some cases it forms lumps. When the flour has assumed this state, it is necessary that the sieve member be continually swept clean of the flour, as otherwise a coat will be formed on the sieve, thereby preventing sifting. By my invention I have provided means for sweeping the sieve member and crushing the lumps which may be formed in the flour. By use of the chute 12 the device is rendered highly efficient when operated by hand power, inasmuch as the operator can rotate the member 14 with one hand and feed the flour into the chute 12 with the other.

This device may also be used in an equally effective manner for the purpose of sifting sugar.

While I have illustrated and described the preferred form of construction for carrying my invention into effect, this is capable of variation and modification without departing from the spirit of the invention. I, therefore, do not wish to be limited to the precise details of the construction set forth, but desire to avail myself of such variations and modifications as come within the scope of the appended claims.

Having described my invention, what I claim as new and desire to secure by Letters Patent, is:—

1. In combination with a flour sifter having a sieve, an agitating member comprising a stem; flanges on the lower end of said stem; sieve sweeping means mounted in said flanges; a shaft mounted in said flanges; flour crushing members mounted on said shaft; and means for moving said sweeping means and crushing members over said sieve, substantially as described.

2. In combination with a flour sifter having a sieve, an agitating member comprising a rotatable member; a plurality of arms secured to and radiating from adjacent one end of said rotatable member; lugs projecting downwardly from one or more of said arms; rollers adapted to contact with the upper surface of said sieve; means for rotatably mounting said rollers on said lugs; and bristle bearing members secured to the remainder of said arms, which alternate with said roller arms, said bristles being adapted to engage the upper surface of said sieve, substantially as described.

3. In combination with a flour sifter having a sieve, an agitating member comprising a rotatable member; a plurality of arms integral with and radiating from adjacent one end of said rotatable member; rollers secured to a shaft extending through a plurality of said arms and adapted to engage with said sieve; and bristle bearing members secured to the remainder of said arms at right angles to said rollers, said bristles being adapted to engage with said sieve, substantially as described.

4. In combination with a flour sifter having a sieve, an agitating member comprising a rotatable member; downwardly and radially extending flanges on said rotatable member; a bristle bearing member mounted in said flanges; a shaft extending through said flanges and said bristle bearing member, at right angles thereto; and a roller on each end of said shaft, said rollers and bristles engaging said sieve in succession.

In testimony whereof I have signed my name to this specification in the presence of two subscribing witnesses.

FRANK SMETANA.

Witnesses:
JOSHUA R. H. POTTS,
B. G. RICHARDS.